Feb. 14, 1950          G. K. McNEILL          2,497,226

METHOD OF MAKING PNEUMATIC TIRES

Filed Feb. 11, 1949                                         2 Sheets-Sheet 1

INVENTOR
GEORGE K. McNEILL
BY Henry P. Truesdell
ATTORNEY

INVENTOR
GEORGE K. McNEILL
ATTORNEY

Patented Feb. 14, 1950

2,497,226

UNITED STATES PATENT OFFICE 2,497,226

METHOD OF MAKING PNEUMATIC TIRES

George K. McNeill, Detroit, Mich., assignor to United States Rubber Company, New York, N. Y., a corporation of New Jersey Application February 11, 1949, Serial No. 75,900

11 Claims. (Cl. 154—14)

1

This invention relates to a method of making pneumatic tires and, in particular, it relates to a method of forming and applying treads to the carcass of pneumatic tires.

In the conventional method of building pneumatic tires, it is customary to assemble the plies of tires to form a carcass. Thereafter a rubber tread and rubber side wall portion are applied to the carcass prior to the shaping operation. When such a tire is shaped and placed in a mold for vulcanization, the rubber composition flows into the tread pattern in the mold as a result of internal pressure within a curing bag within the tire carcass. This flow or movement of the rubber in the tire mold is sometimes substantial particularly when the tire includes large tread elements such as in farm tires. As a result of this rubber movement and as a result of the flexible curing bag within the tire casing, the carcass may assume an irregular or wavy formation. This irregularity is objectionable from the standpoint of its non-uniformity. In other words, the stresses set up in a tire in operation become localized to some extent, thus being detrimental to the service performance of a tire.

Another objectionable feature in the conventional method of assembling a tread on a tire carcass is the method of applying the tread. Treads are conventionally made in the form of a slab which requires that the ends of the slab be joined together in a splicing operation. It frequently happens that such splicing of the tread results in a heavy region in the tire causing an out-of-balance condition in the finished tire.

In accordance with the practice of the present invention, I provide a method of manufacturing tires in which the tire carcass is assembled and shaped, while the tread is formed in a separate operation by a compression molding or injection method and the components are subsequently assembled in the vulcanizing mold. Among the advantages of such an operation are that the tread pattern is completely formed prior to its assembly with the carcass, thus eliminating the work imposed upon the carcass in the shaping of a tread; that it eliminates any wavy or irregular formation of the carcass; that transverse splices are eliminated; that better balance is obtained; that greater uniformity of tread and side wall thickness is accomplished; and that such method of application of the tread may be formed expeditiously and economically. These and other objects and advantages will appear more fully in the following detailed description

2 when considered in connection with the accompanying drawings, in which:

Figure 1:
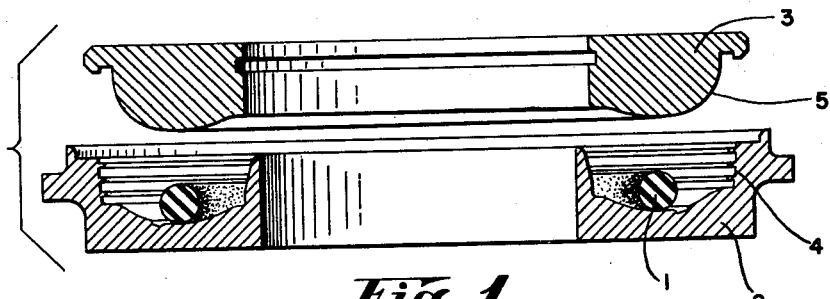
Fig. 1 is a transverse view in section of a tire mold and forming core.

With reference to the drawings and, in particular, to Fig. 1, I show a method of practicing my invention in which a rubber composition 1 is placed in a mold shell 2 and formed by the pressure of a core member 3. The mold shell 2 is provided with a cavity 4 representing the outer profile of a transaxial half of a pneumatic tire and including a tread configuration portion. The core 3 is provided with a contour 5 representing substantial conformity with the outer surface of a tire carcass with which the tread is to be associated.

The composition 1 may be formed of rubber either natural or synthetic or combinations thereof. This rubber composition is placed in the mold shell 2 in the form of an extruded strip of any cross sectional conformity such as the circular shape as shown. The rubber composition 1 is weighed so as to provide a predetermined quantity of rubber capable of filling the cavity formed between the mold shell 2 and the core 3. For purposes of convenience, the rubber composition 1 is spliced together to form an annular ring which is laid at the bottom of the cavity 4 in the mold shell 2. Preferably the rubber composition is warmed prior to its positioning in the shell so as to facilitate better flowing characteristics. It is desirable that the temperature of the stock should be approximately 160° F. It is also desirable that the mold shell 2 be heated so as to maintain a temperature of at least 150° F. The mold core temperature should be less than the mold shell 2. For example, it is desirable to keep the temperature of the core below 100° F.

Figure 2:
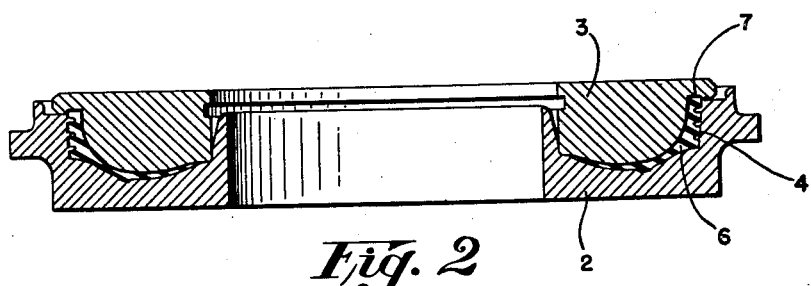
Fig. 2 is a similar view illustrating the mold and core in assembly position in the formation of a tread.

After the rubber composition 1 is placed in the mold shell 2, the core 3 is placed in registry with the mold shell 2 so as to squeeze the rubber 1 until it fills the cavity therebetween. This operation is usually carried on in a press such as a platen press and a low pressure is used until the mold sections are properly forced together. Thereafter high pressure is applied to the press and the line is "bumped" a few times and held for a short duration under high pressure. As a result of this operation, the rubber composition 1 forms a complete transaxial half 6 of a tread as shown in Fig. 2. It is to be understood that reference to the tread 6 includes not only the anti-skid or road engaging portion of the tire, but also that protective layer which extends from the road engaging portion along the side wall of the tire to the bead portion. It will be noted that in this operation a small portion 7 of the tread projects above the transaxial plane of the mold section 2. The purpose of this projection is to provide sufficient rubber at this point so that when two halves of the tread are brought together sufficient pressure will result to form an adequate splice.

After the tread 6 is formed as shown in Fig. 2 the core 3 is removed and a substantially similar operation is followed in the formation of the second half of the tread. This is shown, in particular in Fig. 3 in which a tread 8 is shown in position within an upper mold half 9.

Figure 3:
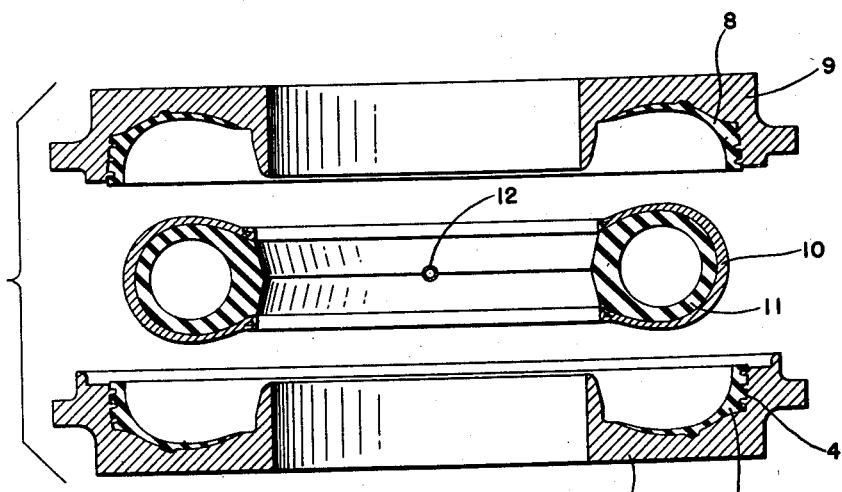
Fig. 3 is a transverse view in section of two mold halves having treads formed therein and positioned in exploded assembled relationship with a tire carcass.
Figure 4:
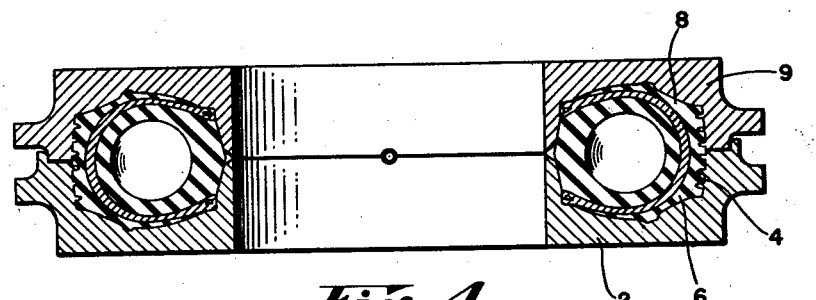
Fig. 4 is a similar view illustrating the mold halves and tire carcass in assembled relationship.

In accordance with conventional practice and as shown in Fig. 3, a tire carcass 10 is assembled, but is shaped prior to the application of a tread. A curing bag 11 is assembled within the carcass 10. The carcass 10 is laid into the mold shell 2 containing the formed tread 6. Thereafter the upper mold shell 9 containing the tread 8 is positioned in complementary relationship with the mold shell 2 so as to unite the tread halves 6 and 8 with the carcass 10. This assembly is shown in Fig. 4.

The remaining operation follows conventional practice; that is, the mold halves 2 and 9 are locked together in a press or pot heater and fluid under pressure is introduced through the stem connector 12 of the curing bag. This pressure within the curing bag forces the carcass into internal contact relationship with the shaped tread and vulcanization is carried on, thus bonding the assembly together to constitute a completed tire.

Figure 5:
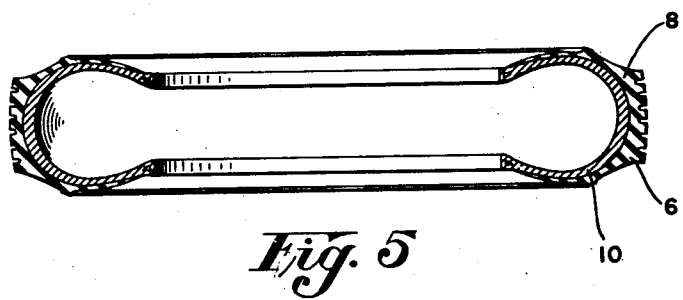
Fig. 5 is a transverse view in section of a completed pneumatic tire manufactured in accordance with the method of the present invention.

Upon completion of the vulcanizing operation, the mold halves are separated, the tire is removed therefrom and the curing bag is removed from the tire. A completed tire as thus made in accordance with the practice of my invention is illustrated in Fig. 5.

Figure 6:
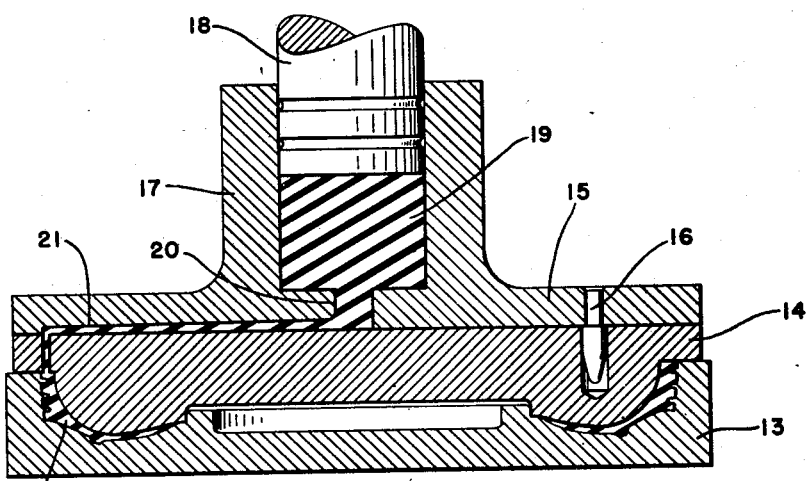
Fig. 6 is a transverse view in section illustrating an injection method for forming a tread in a mold half.

As hereinabove described, the method of forming a tread in the mold is by squeezing a quantity of rubber composition lying in the mold shell. This method I refer to as compression molding. I also contemplate a method of forming a tire tread by means of injection molding such as illustrated in Fig. 6. In this view, I show the lower mold section 13 and a core member 14, the combination of which forms a cavity into which tread rubber is injected. Above the core member 14 is a plate 15 held in registry with the core member 15 by means of a dowel 16. Extending centrally from the plate 15 is a cylinder 17 into which a piston 18 is slidable. A quantity of rubber composition 19 is placed within the cylinder 17 and the piston 18 is moved downward forcing the rubber composition through an opening 20 in the base of the cylinder 17. From this opening 20 a plurality of apertures 21 extending radially from the opening 20 communicate with the cavity formed by the mold members 13 and 14. By this arrangement the rubber composition 19 is forced from the cylinder 17 so as to form a tread 22 comparable to the tread halves 6 and 8 as hereinabove described. By providing the apertures 21 adjacent to the top surface of the core 14, these apertures may be easily cleaned and the rubber removed therefrom when the core 14 and the plate 15 are separated. When a tread 22 is formed by this injection method, a complementary tread is also formed in another mold and the two halves are assembled with a tire carcass and vulcanized as previously described.

By this method of forming and assembling components of the pneumatic tire, tests have demonstrated that tires may be formed with great precision and uniformity. A preferred method of the invention has been shown and described and is more specifically defined as appearing in the scope of the appended claims.

Having thus described my invention what I claim and desire to protect by Letters Patent is:

1. The method of manufacturing pneumatic tires comprising the steps, placing in a mold having a cavity in the form of a portion of a transaxial annulus defining a tread and sidewall region, a predetermined quantity of a rubber-like composition, engaging the mold with a core portion adapted for complementary association with said mold, pressing the mold and core portion together to form a transaxial half of a tire tread and sidewall portion, forming a second half of a tread and sidewall portion, joining the two halves together and in engagement with the exterior of a shaped tire carcass, and vulcanizing the assembly.

2. The method of manufacturing pneumatic tires comprising the steps, placing in a mold having a cavity in the form of a portion of a transaxial annulus defining a tread and sidewall region, a predetermined quantity of a rubber-like composition, pre-heating the rubber-like composition prior to placing it in said mold, engaging the mold with a core portion adapted for complementary association with said mold, pressing the mold and core portion together to form a transaxial half of a tire tread and sidewall portion, forming a second half of a tread and sidewall portion, joining the two halves together and in engagement with the exterior of a shaped tire carcass, and vulcanizing the assembly.

3. The method of manufacturing pneumatic tires comprising the steps, placing in a a mold having a cavity in the form of a portion of a transaxial annulus defining a tread and sidewall region, a predetermined quantity of a rubber-like composition, engaging the mold with a core portion adapted for complementary association with said mold, pressing the mold and core portion together to form a transaxial half of a tire tread and sidewall portion, forming the edge of the tread of the transaxial annulus so that it extends above the face of said mold, forming a second half of a tread and sidewall portion, joining the two halves together and in engagement with the exterior of a shaped tire carcass, and vulcanizing the assembly.

4. The method of manufacturing pneumatic tires comprising the steps, placing in a mold having a cavity in the form of a portion of a transaxial annulus defining a tread and sidewall region, a predetermined quantity of a rubber-like composition, pre-heating the rubber-like composition prior to placing it in said mold, engaging the mold with a core portion adapted for complementary association with said mold, pressing the mold and core portion together to form a transaxial half of a tire tread and sidewall portion, forming the edge of the tread of the transaxial annulus so that it extends above the face of said mold, forming a second half of a tread and side wall portion, joining the two halves together and in engagement with the exterior of a shaped tire carcass, and vulcanizing the assembly.

5. The method of manufacturing pneumatic tires comprising the steps, forming a carcass of plies of strain resisting elements into substantial tire shape, preforming transaxial halves of a tread and sidewall portions of rubber-like composition, assembling the preformed tread and sidewall portions with the carcass, and vulcanizing the assembly.

6. The method of manufacturing pneumatic tires comprising the steps, forming a carcass of plies of strain resisting elements into substantial tire shape, inserting a curing bag in the carcass, preforming transaxial halves of a tread and sidewall portions of rubber-like composition, assembling the preformed tread and sidewall portions with the carcass in a mold, introducing fluid pressure into the curing bag to stitch the carcass to the tread and sidewalls, and vulcanizing the assembly.

7. The method of manufacturing pneumatic tires comprising the steps, placing in a mold having a cavity in the form of a portion of a transaxial annulus defining a tread and sidewall region, a predetermined quantity of a rubber-like composition, engaging the mold with a core portion adapted for complementary association with said mold, pressing the mold and core portion together to form a transaxial half of a tire tread and sidewall portion, forming a second half of a tread and sidewall portion, forming a carcass of plies of strain resisting elements into substantial tire shape, inserting a curing bag in the carcass, joining the two halves of the mold together with said carcass interposed therebetween, and vulcanizing the assembly.

8. The method of manufacturing pneumatic tires comprising the steps, placing in a mold having a cavity in the form of a portion of a transaxial annulus defining a tread and sidewall region, a predetermined quantity of a rubber-like composition, engaging the mold with a core portion adapted for complementary association with said mold, pressing the mold and core portion together to form a transaxial half of a tire tread and sidewall portion, forming a second half of a tread and sidewall portion, forming a carcass of plies of strain resisting elements into substantial tire shape, inserting a curing bag in the carcass, joining the two halves of the mold together with said carcass interposed therebetween, introducing fluid pressure into the curing bag to stitch the carcass to the tread and sidewalls, and vulcanizing the assembly.

9. The method of manufacturing pneumatic tires comprising the steps, forming a carcass of plies of strain resisting elements into substantial tire shape, inserting a curing bag in the carcass, forming in a mold a transaxial half of a tire tread and sidewall portion of rubber-like composition, forming a second similar tread and sidewall portion, placing the carcass in one of the molds, assembling the molds together, and vulcanizing.

10. The method of manufacturing pneumatic tires comprising the steps, forming a carcass of plies of strain resisting elements into substantial tire shape, injecting in molds a pair of substantially transaxial rubber-like shells of an annulus, assembling the shells with the carcass, and vulcanizing the assembly.

11. The method of manufacturing pneumatic tires comprising the steps, forming a carcass of plies of strain resisting elements into substantial tire shape, inserting a curing bag in the carcass, injecting in molds a pair of substantially transaxial rubber-like shells of an annulus, assembling the shells with the carcass while the shells remain in the molds, and vulcanizing the assembly.

GEORGE K. McNEILL.

REFERENCES CITED

The following references are of record in the file of this patent:

UNITED STATES PATENTS

| Number | Name | Date |
| --- | --- | --- |
| 2,232,001 | Hawkinson | Feb. 8, 1941 |
| 2,421,097 | Lakso | May 27, 1947 |
| 2,422,266 | Steinke | June 17, 1947 |
| 2,456,580 | Carter et al. | Dec. 14, 1948 |